June 22, 1954 S. J. SPURGEON 2,681,717
LOAD DRIVING AND BRAKING APPARATUS
Filed Dec. 30, 1950 2 Sheets-Sheet 2
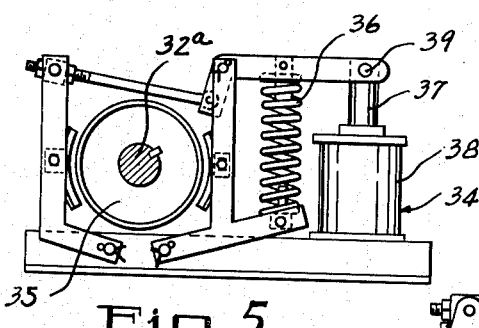
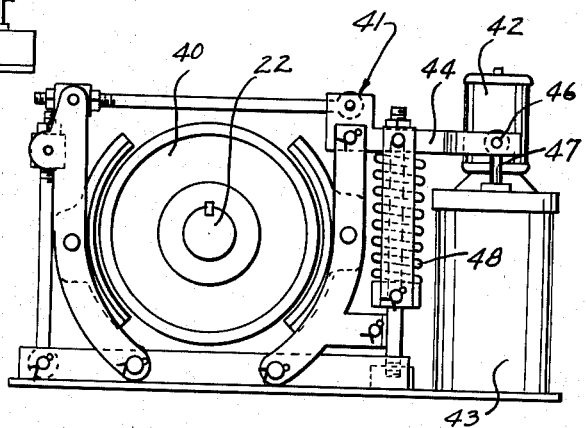
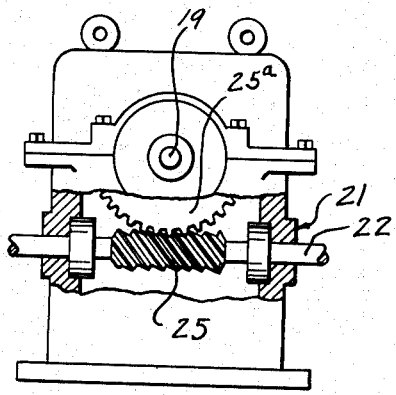
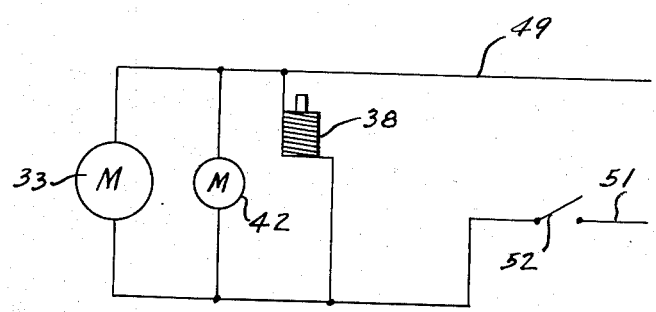
INVENTOR.
SAMUEL J. SPURGEON
BY
Jennings & Carter
ATTORNEYS Patented June 22, 1954

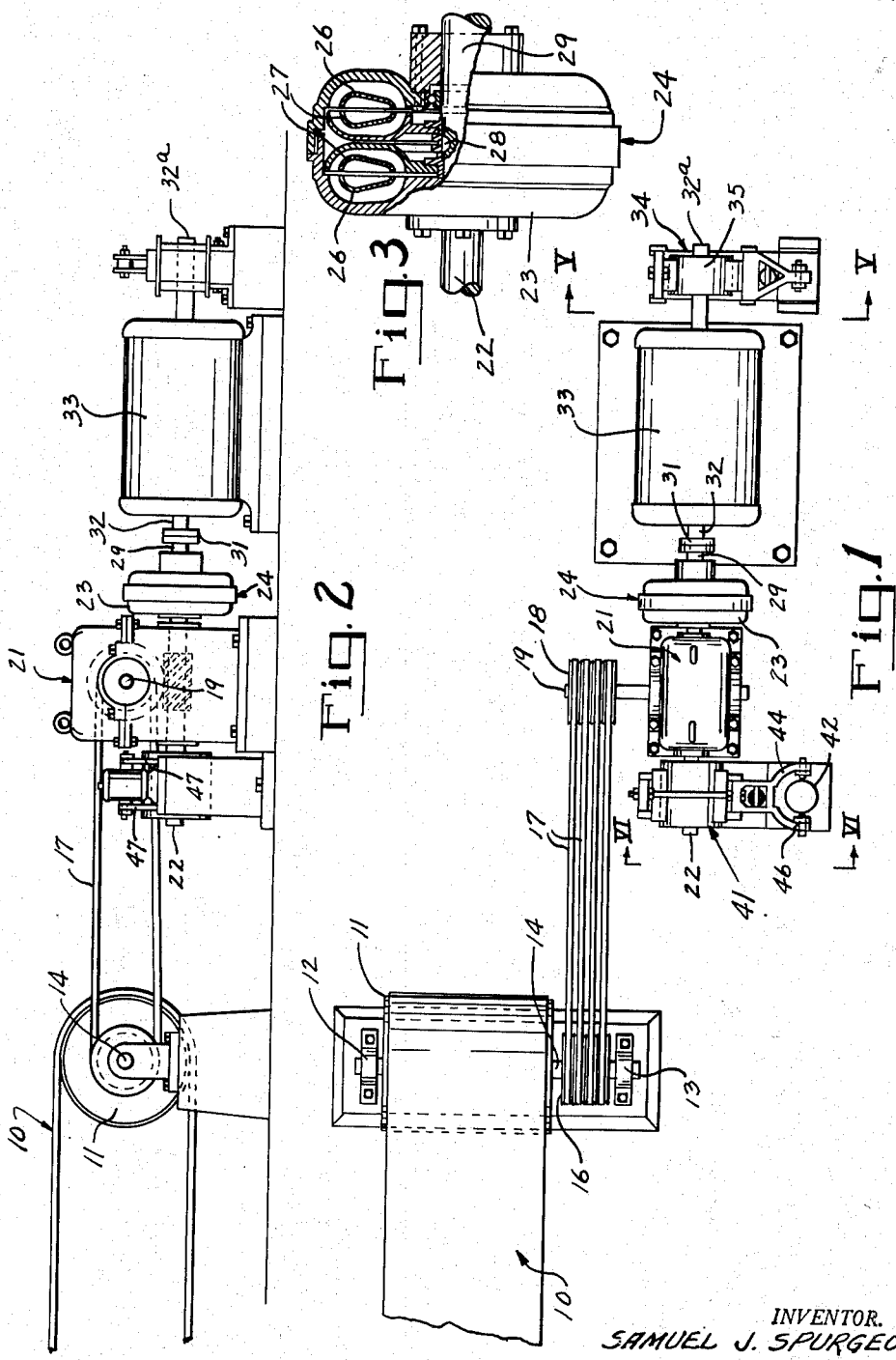

2,681,717

UNITED STATES PATENT OFFICE 2,681,717

LOAD DRIVING AND BRAKING APPARATUS

Samuel J. Spurgeon, Birmingham, Ala.

Application December 30, 1950, Serial No. 203,733

7 Claims. (Cl. 192—2)

My present invention relates to apparatus for transmitting driving power from a prime mover to a load and to such apparatus which shall embody means for braking and stopping the load by dissipating a considerable portion of the energy thereof during the period of actual braking.

This invention finds particular application for use in driving conveyers of the belt type, although as will be pointed out its use is not limited to such apparatus. However, for the purpose of illustrating the invention it will be described in association with a belt conveyer.

As is well understood, the inertia ($WR^2$) of a moving load such as a loaded conveyer belt makes the stopping of such a belt a very difficult operation. This is especially true if the belt, which may be from a few hundred yards to a few miles in length, travels down grade or over hilly terrain. If material is continually fed onto a belt at the up grade end, the force of gravity adds to the inertia, resulting in a figure for the expression $WR^2$ which is tremendously large. Heretofore, the driving apparatus for such belts has been equipped with various forms of brakes for stopping the belt, including, among others, solenoid actuated brakes. In practice it has been found that the inertia of even medium length conveyor belts is so great that the brake bands of the brakes heretofore used were of unusually short life. In some instances the linings have been known to wear away completely within a matter of days, the precise time depending, of course, on the number of times the belt is stopped as well as on many other factors.

In seeking to overcome the above and other difficulties I have discovered that through the use of a slip type drive mechanism such as a fluid drive, magnetic coupling, or the like between the prime mover and the load together with two brakes, one on either side of the fluid drive, I can materially reduce the wear on the brake bands.

The prime object of my invention therefore is to provide apparatus of the character designated in which the power of a prime mover is transmitted to a load through a fluid type coupling or its equivalent, in combination with brake mechanisms operatively connected to the driving and driven elements of the fluid coupling, whereby when the load is to be stopped it is accomplished by de-energizing the prime mover, applying the brake associated with the driving element of the fluid coupling to hold it against rotation, thereby dissipating the energy of the moving load as heat in the coupling, and then in applying the brake connected to the driven element of the fluid coupling, thereby bringing the load to a stand still.

A further object is to provide apparatus of the character designated in which the brake mechanism operatively associated with the driving element of the slip type drive mechanism is of the relatively quick acting type and in which the brake mechanism connected to the driven element of the slip type drive mechanism, essentially to the load itself, is of the delayed action type, whereby the first named brake when applied is effective to immediately stop and lock the driving element against rotation, while the other brake is subsequently applied, permitting a large part of the energy of the moving load to be dissipated as heat in the slip type drive mechanism.

A further object is to provide apparatus of the character designated in which the brake connected to the driving element of the drive mechanism may be of the delayed action type or of a type wherein the driving element is permitted to come gradually to a stop, thereby obtaining the advantages pointed out hereinafter.

Apparatus illustrating the features of my invention is shown in the accompanying drawings forming a part of this application in which:

Fig. 1 is a somewhat diagrammatic plan view showing my invention associated with the drive end of a belt conveyer;

Fig. 2 is a side elevational view of the assembly shown in Fig. 1;

Fig. 3 is a view, partly in elevation and partly in section and showing a suitable form of fluid coupling, the drawing being somewhat diagrammatic for the sake of clarity;

Fig. 4 is a side elevational view of a reduction gear unit partly broken away and in section;

Fig. 5 is a view taken generally along line V—V of Fig. 1 and illustrating a type of brake which may be operatively connected to the driving element of the fluid coupling;

Fig. 6 is a view taken generally along line VI—VI of Fig. 1 and showing an elevational view of a delayed action type of brake suitable for use in my improved apparatus; and, Fig. 7 is a wholly diagrammatic wiring diagram.

Referring now to the drawings for a better understanding of my invention I show at 10 a conveyer belt representing the load to be driven. The belt is shown in diagrammatic manner as being trained over a driving pulley 11, suitably supported in bearings 12 and 13 on the shaft 14 of the pulley 11. On the shaft 14 are a plurality of sheaves 16 or sprockets over which are trained multiple V-belts 17 or chains, if desired. The V-belts 17 pass over pulleys 18 mounted on the output shaft 19 of a reduction gear unit indicated generally by the numeral 21.

The gear reduction unit 21 may comprise a double extension input shaft 22 having thereon a worm 25. The worm 25 meshes with a gear 25a which is fast on the shaft 19. As will be understood, the pitch of the worm and gear are such that the shaft 22 can be rotated when the load represented by the conveyer belt 10 drives the shaft 19. In other words, the type of gear box used is not the type involving the locking worm and gear arrangement, but on the other hand is one involving what may be termed the free wheeling type of worm and gear drive.

Connected to one end of the shaft 22 is the driven unit or section 23 of a fluid coupling power transmitting element unit indicated generally by the numeral 24. As will be understood, the fluid coupling mechanism comprises an outer housing, represented by the portion 23 which is the driven portion. Within the housing section 23 are a plurality of blades or vanes 26. Cooperating with the vanes 26 are other sets of vanes 27 which are keyed as at 28 to a shaft 29. The casing of the unit is oiltight and as is well known when there is relative rotation between the vanes 26 and 27, hydraulic fluid within the casing serves to transmit power. Thus, the entire outer housing section indicated by the numeral 23 may be defined for the purpose of description as the driven element of the fluid coupling whereas the vanes 27 may be described as the driving element thereof. In practice it will be understood that the hydraulic coupling is capable of transmitting power in both directions, namely, the shaft 29 will be rotated if shaft 22 becomes the driving element, and shaft 22 will be rotated if shaft 29 is driven. Industrial types of fluid coupling units are well known in the art and no further detailed description is deemed to be necessary.

The shaft 29 may be connected through a flexible coupling 31 to one end of the rotor shaft 32 of an electric motor prime mover 33.

The other extending end 32a of the rotor shaft 32 is keyed to a brake drum 35 forming a part of an instantaneous solenoid actuated brake unit indicated generally by the numeral 34. While various forms of brakes may be employed, in some instances I prefer to use a magnetic brake of the solenoid type in which the solenoid is energized to release the brake. When de-energized a spring 36 applies the brake through the linkage illustrated in Fig. 5. It will be understood that the armature 37 of the solenoid 38 is pivotally connected at 39 to the linkage system illustrated. A suitable type of solenoid actuated brake is described in "Descriptive Bulletin No. 15–340," dated July 1943, issued by the Westinghouse Electric Corporation, Buffalo, New York. As is understood in the art for the operation of such devices, when the solenoid 38 is energized the brake is released, and when de-energized the spring 36 suddenly returns the unit to full braking position.

The opposite end of the shaft 22 projecting from the gear box unit 21 may be keyed to the brake drum 40 of a delayed action type of brake 41. A suitable form of brake of this type is also disclosed in the above mentioned bulletin. In general, the unit 41 comprises a small electric motor 42 which drives a hydraulic pump (not shown) disposed in a suitable housing 43. When energized the motor drives the pump, pumping fluid in such manner as to cause a yoke 44 to move upwardly due to its connection at 46 to piston rods 47, thus to release the brake. When the motor 42 is de-energized, a spring 48 applies the brake. However, the action of the spring 48 is gradual due to an adjustable metering valve in the hydraulic system (not shown), with the effect that the brake is gradually applied, bringing the shaft 22 to a gradual stop.

In Fig. 7 I show diagrammatically a wiring diagram in which the motors 33 and 42 and the solenoid 38 are shown in a common circuit. Power is supplied to the three units through the lines 49 and 51 and is under control of a switch 52. Assuming that the switch 52 is in the position shown, all of the electrical mechanisms are de-energized. When the switch is closed the solenoid 38 is energized, releasing the brake 34 and motor 42 is energized releasing brake 41. By the same action motor 33 is energized, driving the load.

From the foregoing the method of constructing and using my improved apparatus may now be explained and understood. With the apparatus assembled as illustrated and as described and when switch 52 is closed, it will be seen that motor 33 drives the conveyer belt through the fluid coupling unit 24, the reduction gear box 21 and belts 17. When it is desired to stop the load the switch 52 is moved to open position. This de-energizes the motor 33 and solenoid 38 of the brake unit 34. This permits the spring 36 to suddenly apply the brake of the unit 34, locking the vanes 27 against rotation. The motor 42 is also de-energized when the switch 52 is opened. Due to the delay action effect of the unit 41, the brake thereof is applied gradually. In the meantime, that is, between the time the brake 34 is locked and before the brake 41 is locked, the housing 23 of the hydraulic unit 24 carrying blades 26 is still rotating due to the driving action of the load through the belts 17, shaft 19, gear 25a and worm 25. A large part of the energy of the moving load is thereby dissipated in the mechanism 24 in the form of heat. Therefore, by the time brake 41 has completely set to lock the shaft 22 against further rotation and hence completely stop the conveyer belt 10, a large part of the energy of the moving load has been expended. The wear and tear on the brake bands of both the units 34 and 41 is thus reduced to a minimum. Further, when the brake 41 is locked it will be apparent that the load likewise is locked.

Although I have shown a quick acting brake 34 of the solenoid type operatively connected to the driving element of the coupling, it will be understood that I may, in certain cases, employ a different type of brake mechanism. For instance, I may employ one of the delayed action types of brakes 41 in place of the instantaneous type 34, or in other words, employ two of the units 41. In this case, by suitably timing the braking action of the unit associated with the driving element of the fluid coupling, I can gradually bring the driving element of the fluid coupling to a stop. This substitution of brake types finds particular application in installations for driving and stopping very heavy loads such as long conveyer belts. It is understood that the amount of torque transmitted by a fluid type coupling is a function of the slippage between the driving and driven elements thereof. Thus, by gradually applying a brake like the one indicated at 34 and which is connected to the driving element of the unit 24, I can gradually reduce the speed of the elements 27, thereby obtaining infinite slippage ratios, thus obtaining a wide range of stopping torque varying from a minimum at minimum slippage to a maximum at lock position of elements 27. Obviously, if forms of magnetic brakes are employed the above result can be obtained by properly controlling the flux density therein.

When employed as drive means for a conveyer belt, my invention eliminates sudden stopping of the belt. This in turn eliminates the tendency of the belt to pull vertically away from the idlers as has been the case heretofore where a belt traversing hilly terrain was brought to a stop with existing brakes. My improved drive thus reduces strain on the belt and supporting means therefor, permitting the use of lighter belts and driving mechanisms, and reducing the initial and maintenance costs of belt conveyers.

From the foregoing it will be apparent that I have devised an improved apparatus for driving and braking moving loads. My improved apparatus provides a smooth drive as well as a smooth braking arrangement and one which reduces materially the stress and strain on the various parts involved. The component parts of the apparatus have proved in service to be practical and trouble free when operating within the load ranges prescribed therefor.

In this specification and in the appended claims the expression "slip type drive mechanism" means any of the several types of mechanisms in which force is transmitted without actual mechanical connection between the driving and driven elements thereof. Examples of such mechanisms are fluid couplings, ordinary electro-magnetic couplings and that magnetic type embodying ferrous particles suspended in a suitable fluid medium.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In load driving and braking apparatus, the combination with a prime mover and a slip type drive mechanism having driving and driven elements interposed in power transmitting relation between the prime mover and the load, of brake mechanism operatively connected to that element of the slip drive mechanism which is driven by the prime mover, a second brake mechanism operatively connected to that element of the slip drive mechanism which is connected to the load, means to apply the first named brake to hold the associated element of the slip drive mechanism against rotation, and means to apply the second named brake after the first brake has been applied and before the load comes to rest.

2. In load driving and braking apparatus embodying a prime mover and a slip type drive mechanism having driving and driven elements operatively interposed in power transmitting relation between the prime mover and the load, the combination of quick setting brake mechanism operatively connected to that element of the slip drive mechanism which is driven by the prime mover, a delayed action brake mechanism operatively connected to that element of the slip drive mechanism which drives the load, means to energize and de-energize the prime mover, means to fully apply the first named brake substantially simultaneously with the de-energization of the prime mover to lock the same and the driven element against rotation, and means to partially apply the second named brake after the prime mover and the element connected thereto have come to rest and before the load comes to rest.

3. In load driving and braking apparatus embodying an electric motor prime mover and a two element fluid coupling operatively interposed in driving relation between the motor and load, the combination of separate electrically controlled brake mechanisms one of which is connected to the driving element of the fluid coupling and the other of which is connected to the driven element thereof, circuits within which are included a source of E. M. F. and said brake mechanisms and said electric motor, and a switch in said circut controlling the motor and the brake mechanisms.

4. In load driving and braking apparatus, the combination with an electric motor prime mover and a fluid coupling having driving and driven elements operatively connected to the prime mover and load respectively, of a delayed action type of brake operatively connected to the driven element of the coupling, means to de-energize the prime mover and hold the driving element against rotation and means to commence the setting of said brake after the electric prime mover has been de-energized whereby at least a part of the energy of the moving load is dissipated in said fluid coupling in the form of heat.

5. In load driving and braking apparatus, the combination with an electric motor prime mover and a two element fluid coupling interposed in power transmitting relation between the prime mover and the load and wherein the electric motor is connected to the driving element of the fluid coupling and the load is operatively connected to the driven element thereof, of a first electro-magnetic brake mechanism of the quick acting type operatively connected to the driving element of the fluid coupling, a second electro-magnetic brake of the delayed action type operatively connected to the driven element of the fluid coupling, electric circuits, a source of E. M. F. within which are included the electric motor prime mover and the electro-magnetic brakes, and a common switch for said circuits.

6. The combination with a load driven by a prime mover through a two element fluid coupling, of a first brake of the quick setting type set by spring means upon de-energizing a solenoid associated therewith, means operatively connecting said first brake to that element of the fluid coupling which is driven by the prime mover, a second brake of the delayed setting type set by a spring upon de-energizing a pressure means associated therewith, means operatively connecting the second brake to that element of the fluid coupling which is connected to the load, and means to substantially simultaneously de-energize the prime mover and said solenoid and pressure means associated with said brakes, whereby the prime mover and the element of the coupling driven thereby are brought to a standstill by said quick setting brake prior to the complete setting of the delayed setting brake.

7. In load driving and braking apparatus, the combination with a prime mover and a slip type drive mechanism having a driving element operatively connected to the prime mover and a driven element operatively connected to the load, brake mechanism operatively connected to the driven element of the slip drive mechanism, means to energize and de-energize the prime mover, means to hold the de-energized prime mover and its associated driving element against rotation, and means operable after the prime mover and said associated driving element are brought to rest at least partially to set said brake mechanism, whereby at least a part of the energy of the moving load is dissipated in said slip type drive mechanism in the form of heat.

References Cited in the file of this patent

UNITED STATES PATENTS

| Number | Name | Date |
| --- | --- | --- |
| 1,746,372 | Turnbull et al. | Feb. 11, 1930 |
| 2,309,413 | Neracher et al. | Jan. 26, 1943 |
| 2,394,331 | Roche | Feb. 5, 1946 |
| 2,421,056 | Dake et al. | May 27, 1947 |
| 2,421,190 | Dodge | May 27, 1947 |